United States Patent
Leitner et al.

(10) Patent No.: US 9,011,738 B2
(45) Date of Patent: Apr. 21, 2015

(54) MONOMER BEADS FOR PRODUCING A PROTON-CONDUCTING MEMBRANE

(75) Inventors: Klaus Leitner, Ludwigshafen (DE); Sameer Nalawade, Mannheim (DE)

(73) Assignee: BASF SE (DE)

( * ) Notice: Subject to any disclaimer, the term of this patent is extended or adjusted under 35 U.S.C. 154(b) by 350 days.

(21) Appl. No.: 13/144,207

(22) PCT Filed: Jan. 14, 2010

(86) PCT No.: PCT/EP2010/000165
§ 371 (c)(1),
(2), (4) Date: Sep. 27, 2011

(87) PCT Pub. No.: WO2010/081698
PCT Pub. Date: Jul. 22, 2010

(65) Prior Publication Data
US 2012/0007263 A1  Jan. 12, 2012

(30) Foreign Application Priority Data
Jan. 14, 2009  (EP) .................................. 09000398

(51) Int. Cl.
- *B01D 45/00* (2006.01)
- *H01M 8/02* (2006.01)
- *C08G 73/06* (2006.01)
- *C08G 73/18* (2006.01)
- *H01M 8/10* (2006.01)

(52) U.S. Cl.
CPC ......... *H01M 8/0291* (2013.01); *C08G 73/0627* (2013.01); *C08G 73/0633* (2013.01); *C08G 73/18* (2013.01); *H01M 8/103* (2013.01); *H01M 8/1048* (2013.01); *H01M 8/1072* (2013.01); *H01M 8/109* (2013.01); *Y02E 60/521* (2013.01)

(58) Field of Classification Search
USPC .......................................................... 264/41
See application file for complete search history.

(56) References Cited

U.S. PATENT DOCUMENTS

| | | |
|---|---|---|
| 4,191,618 A | 3/1980 | Coker et al. |
| 4,212,714 A | 7/1980 | Coker et al. |
| 4,333,805 A | 6/1982 | Davidson et al. |
| 2004/0094750 A1 * | 5/2004 | Widagdo et al. ............... 252/500 |
| 2006/0035095 A1 * | 2/2006 | Calundann et al. ........ 428/473.5 |
| 2008/0050514 A1 | 2/2008 | Calundann et al. |
| 2010/0181697 A1 | 7/2010 | Uensal et al. |
| 2011/0014545 A1 | 1/2011 | Calundann et al. |
| 2011/0097643 A1 * | 4/2011 | Stanic ........................... 429/483 |

FOREIGN PATENT DOCUMENTS

| | | |
|---|---|---|
| DE | 10117686 A1 | 10/2002 |
| DE | 102 35 357 A1 | 2/2004 |
| DE | 10242708 A1 | 5/2004 |
| DE | 102006042760 A1 | 3/2008 |
| JP | 2001-118591 A | 4/2001 |
| WO | WO-02/088219 A1 | 11/2002 |

OTHER PUBLICATIONS

Translation of the International Preliminary Report on Patentability for PCT/EP2010/000165 dated Jul. 19, 2011.

* cited by examiner

*Primary Examiner* — Larry Thrower
(74) *Attorney, Agent, or Firm* — Drinker Biddle & Reath LLP

(57) ABSTRACT

Monomer beads which can be obtained according to a process in which
i. one or more aromatic tetraamino compounds are mixed with one or more aromatic carboxylic acids comprising at least two acid groups per carboxylic acid monomer in an extruder and melted at 190° C.-270° C.;
ii. the melt is dropletized at 190° C.-270° C. by means of a die located at the extruder outlet;
iii. the liquid droplets are collected, cooled and allowed to solidify.

The monomer beads are particularly suited to the production of a proton-conducting polymer membrane based on polyazoles.

10 Claims, No Drawings

MONOMER BEADS FOR PRODUCING A PROTON-CONDUCTING MEMBRANE

CROSS-REFERENCE TO RELATED APPLICATIONS

This application is a national stage application (under 35 U.S.C. §371) of PCT/EP2010/000165, filed Jan. 14, 2010, which claims benefit of EP 09000398.9, filed Jan. 14, 2009.

BACKGROUND OF THE INVENTION

The present invention relates to novel monomer beads for producing a proton-conducting polymer membrane based on polyazoles, which, owing to its excellent chemical and thermal properties, can be used widely and is particularly suitable as polymer-electrolyte membrane (PEM) in PEM fuel cells.

Polyazoles such as polybenzimidazoles (®Celazole) have been known for a long time. Such polybenzimidazoles (PBI) are usually produced by reacting 3,3', 4,4'-tetraaminobiphenyl with terephthalic acid or esters thereof in the melt. The prepolymer formed solidifies in the reactor and is subsequently broken up mechanically. The pulverulent prepolymer is subsequently fully polymerized in a solid-state polymerization at temperatures of up to 400° C. to give the desired polybenzimidazoles.

To produce polymer films, the PBI is, in a further step, dissolved in polar, aprotic solvents such as dimethylacetamide (DMAc) and a film is produced by classical methods.

The basic polyazole films can subsequently be doped with concentrated phosphoric acid or sulfuric acid and then act as proton conductors and separators in polymer electrolyte membrane fuel cells (PEM fuel cells).

The acid-doped polymer membranes based on polyazoles which can be obtained in this way display an advantageous property profile. However, owing to the applications desired for PEM fuel cells, especially in the automobile sector and decentralized power and heat generation (stationary applications), these still require overall improvement.

WO 02/088219 therefore proposes the use of a proton-conducting polymer membrane based on polyazoles, which can be obtained by a process comprising the steps A) Mixing of one or more aromatic tetraamino compounds with one or more aromatic carboxylic acids or esters thereof which comprise at least two acid groups per carboxylic acid monomer, or mixing of one or more aromatic and/or heteroaromatic diamino carboxylic acids, in polyphosphoric acid to form a solution and/or dispersion,
B) Application of a layer to a support using the mixture according to step A),
C) Heating of the sheet-like structure/layer which can be obtained according to step B) under inert gas to temperatures of up to 350° C., preferably up to 280° C., to form the polyazole polymer,
D) Treatment of the membrane formed in step C) until it is self-supporting.

However, such a procedure is relatively time-consuming and complicated. Furthermore, the polycondensation or the reaction time is not always completely reproducible, which frequently makes the production process more difficult.

Thus, for example, a reaction time of more than 35 hours is usually required for the polycondensation of 3,3',4,4'-tetraaminobiphenyl with terephthalic acid in polyphosphoric acid. Furthermore, the precise stoichiometry of the two monomers has to be adhered to since otherwise a sufficiently high molecular weight is not built up.

A further problem is the necessity of freshly premixing the monomers. For the two monomers to become similarly well distributed in the polyphosphoric acid, they have to be premixed in powder form and added as a homogeneous mixture to the polyphosphoric acid. However, this premixing has to be carried out separately for each batch. If larger batches of monomer mixtures were to be produced beforehand, the monomers would demix during storage.

Finally, the different dissolution rates of the monomers also lead to additional problems. When the monomer mixture is stirred into and dissolved in the polyphosphoric acid, the 3,3',4,4'-tetraaminobiphenyl goes into solution substantially more quickly than the terephthalic acid. It is frequently observed that residues of monomer powder accumulate on the stirrer or on the vessel walls and are thus withdrawn from the reaction solution. This leads to a nonstoichiometric ratio of the two monomers in the reaction mixture, which in turn has an adverse effect on the build-up of the molar mass in the polycondensation.

BRIEF SUMMARY OF THE INVENTION

It was therefore an object of the present invention to provide possible ways of improving the process for producing a proton-conducting polymer membrane based on polyazoles further. A process which can be carried out on an industrial scale and very inexpensively in a very simple way is sought. In particular, very short reaction times and very uniform and reproducible reactions should be achieved. Furthermore, better scale-up of the reaction batch and the production of particularly uniform polymers were sought.

These and further objects which can be derived directly from the relationships discussed at the outset are achieved by the use of monomer beads which can be obtained according to a process having all the features of the present claim 1.

Particularly advantageous modifications of the process are described in the dependent claims. Furthermore, the monomer beads which can be obtained in this way and their use for producing a proton-conducting polymer membrane are protected.

Provision of monomer beads which can be obtained according to a process in which
i. one or more aromatic tetraamino compounds are mixed with one or more aromatic carboxylic acids comprising at least two acid groups per carboxylic acid monomer in an extruder and melted at 190° C.-270° C.;
ii. the melt is dropletized at 190° C.-270° C. by means of a die located at the extruder outlet;
iii. the liquid droplets are collected, cooled and allowed to solidify. makes it possible, in a manner which could not readily have been foreseen, to considerably improve the process for producing a proton-conducting polymer membrane based on polyazoles. This is achieved according to the invention in a comparatively simple way, industrially and comparatively inexpensively. In particular, considerably shorter reaction times and extremely uniform and reproducible reactions are achieved. Furthermore, it allows the reaction batch to be scaled up more readily and allows the production of particularly uniform polymers.

DETAILED DESCRIPTION OF THE INVENTION

The use of the monomer beads of the invention brings, in particular, the following advantages:
The monomers are homogeneously melted and/or homogeneously dispersed in the monomer melt in an extruder without the monomers demixing and/or decomposing.

Thus, for example, pure 3,3',4,4'-tetraaminobiphenyl melts at about 176° C. and can be melted without problems. Terephthalic acid, on the other hand, has no melting point but decomposes in the temperature range from 300° C. to 400° C. Thus, the 3,3',4,4'-tetraaminobiphenyl is melted in the extruder and the terephthalic acid is homogeneously dispersed in the 3,3',4,4'-tetraaminobiphenyl melt without demixing or decomposing.

Relatively large amounts of monomer mixtures can be made up and stored in the form of the monomer beads without demixing of the monomers in the storage vessels having to be feared, as in the case of the pulverulent monomer mixture.

The glass-like structure and the smooth surface of the monomer beads produced in the extruder results in no dusts being formed, and in particular the formation of 3,3',4,4'-tetraaminobiphenyl dust is thus avoided. Since fine dusts can be inhaled easily and aromatic tetraamino compounds such as 3,3',4,4'-tetraaminobiphenyl are suspected of possibly being carcinogenic, this is a tremendous gain in terms of safety in production.

It has been confirmed that pulverulent tetraamino compounds/aromatic carboxylic acid mixtures, e.g. 3,3',4,4'-tetraaminobiphenyl/terephthalic acid mixtures, can cause dust explosions. Since dust formation does not occur when the monomer beads are used, the risk of a dust explosion is avoided.

It has been found in practice that tetraamino compounds/aromatic carboxylic acid powder mixtures, e.g. 3,3',4,4'-tetraaminobiphenyl/terephthalic acid powder mixtures, accumulate high electrostatic charges quickly and adhere to powder funnels, vessel walls, containers, etc. This leads to an error when weighing out the starting materials and to an increased outlay for cleaning. These problems do not occur when the monomer beads of the invention are used since no dusts are formed.

Furthermore, it has been found that the polycondensation of the monomer beads of the invention proceeds more quickly than the polycondensation of a pulverulent monomer mixture.

Residues of monomer beads which may possibly accumulate on the stirrer or another place during the polycondensation reaction and cannot be introduced into the reaction mixture less readily lead to nonstoichiometric conditions since all monomers are withdrawn in the same ratio from the reaction mixture.

The monomer beads of the invention comprise one or more aromatic tetraamino compounds and one or more aromatic carboxylic acids. They can be obtained by a process in which i. one or more aromatic tetraamino compounds are mixed with one or more aromatic carboxylic acids comprising at least two acid groups per carboxylic acid monomer in an extruder and melted at 190° C.-270° C., preferably 200° C.-250° C., particularly preferably 220° C.-245° C., in particular 230° C.-<240° C.;

ii. the melt is dropletized at 190° C.-270° C., preferably 200° C.-250° C., particularly preferably 220° C.-245° C., in particular 230° C.-<240° C., by means of a die located at the extruder outlet;

iii. the liquid droplets are collected, cooled and allowed to solidify.

The extrusion of the monomer mixture can be carried out in a manner known per se.

The residence time of the mixture of tetraamino compounds and carboxylic acids in the extruder is ideally short in order to avoid undesirable prepolymer formation as much as possible. Average residence times of less than 10 minutes, advantageously less than 5 minutes, in particular less than 1 minute, have been found to be particularly useful. In this context, the average residence time is the quotient of the free volume of the extruder and the throughput of material per unit time.

The screw geometry and the length of the extruder screw are preferably selected so that the residence time of the mixture in the extruder is reduced to a minimum. In particular, the use of extruders which have a single screw and ideally no kneading elements has been found to be particularly useful.

The internal temperature of the extruder is preferably set so that complete melting of the mixture of tetraamino compounds and carboxylic acids is ensured but prepolycondensate formation is suppressed as far as possible. Preference is given to internal temperatures of at least 200° C., preferably in the range from >210° C. to <270° C., particularly preferably in the range from >220° C. to <250° C., in particular in the range from 230° C. to <240° C.

The throughput of the mixture of tetraamino compounds and carboxylic acids to be extruded and the die are preferably matched to one another so that corresponding droplets having the desired size are formed. Particular preference is given to monomer beads having a diameter in the range from 1 to 5 mm, in particular to 2-3 mm.

A die diameter which is too low limits the throughput and tends to result in blockages. In a preferred embodiment of the present invention, the die or the die head are heated so that the melt cannot cool and thus solidify in the die. Particularly preferred diameters of the die are in the range from 0.3 mm to 10 mm, in particular in the range from 2 mm to 5 mm.

Furthermore, experience has shown that the die should be placed as close as possible to the extruder; conduits between extruder and die which are too long lead to excessively long residence times in the conduits and promote undesirable prepolymer formation in the conduit.

According to the present invention, the melt is preferably dropletized into an inert liquid, i.e. into a liquid which does not react with the constituents of the melt under the given conditions. The melt is preferably dropletized into a liquid which is thermally stable up to 250° C. and which can preferably be subsequently removed very completely from the monomer beads by washing with lipophilic solvents. The use of mineral oils, in particular white oils (paraffin oils), has been found to be very particularly useful here.

The solidified beads are then advantageously washed with an inert solvent to remove any adhering substances, e.g. the inert liquid, and then dried in order to remove any adhering solvent. Suitable solvents comprise, inter alia, nonpolar solvents which dissolve neither tetraamino compounds nor carboxylic acids in significant amounts. These are, in particular, solvents having a low dipole moment ($<3\times10^{-30}$ cm) and low dipole constant (<3), in each case measured at 25° C. Further particularly useful solvents are cyclohexane, pentane, hexane, heptane, benzene and toluene.

Drying is preferably carried out in a vacuum drying oven at temperatures in the range from room temperature to about 150° C., preferably from 40° C. to 80° C. It serves merely to achieve very quantitative evaporation of the washing liquid.

As an alternative to dropletization into a liquid, dropletization can also be effected in a prilling tower. This has the advantage that no oil subsequently has to be removed from the beads. The distance through which the melt falls is preferably selected so that the beads are completely solidified before reaching the bottom. Distances of a number of meters, in particular from 2 m to 10 m, have been found to be particularly useful.

The aromatic and/or heteroaromatic tetraamino compounds used according to the invention are preferably 3,3',4,4'-tetraaminobiphenyl, 2,3,5,6-tetraaminopyridine, 1,2,4,5-tetraaminobenzene, bis(3,4-diaminophenyl) sulfone, bis(3,4-diaminophenyl) ether, 3,3',4,4'-tetraaminobenzophenone, 3,3',4,4'-tetraaminodiphenylmethane and/or 3,3',4,4'-tetraaminodiphenyldimethylmethane.

The aromatic carboxylic acids used according to the invention are preferably dicarboxylic acids, tricarboxylic acids and/or tetracarboxylic acids, in particular dicarboxylic acids. The term aromatic carboxylic acids also encompasses heteroaromatic carboxylic acids. The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, 2,2-bis(4-carboxyphenyl)hexafluoropropane, 4,4'-stilbenedicarboxylic acid and/or 4-carboxycinnamic acid.

The aromatic tricarboxylic acids are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid and/or 3,5,4'-biphenyltricarboxylic acid.

The aromatic tetracarboxylic acids are preferably 3,5,3',5'-biphenyltetracarboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid and/or 1,4,5,8-naphthalenetetracarboxylic acid.

The heteroaromatic carboxylic acids used according to the invention are preferably heteroaromatic dicarboxylic acids, tricarboxylic acids and/or tetracarboxylic acids, in particular dicarboxylic acids. For the purposes of the present invention, heteroaromatic carboxylic acids are aromatic systems which comprise at least one nitrogen, oxygen, sulfur or phosphorus atom in the aromatic. Preference is given to pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid and/or benzimidazole-5,6-dicarboxylic acid.

The content of tricarboxylic acids and/or tetracarboxylic acids, based on dicarboxylic acids used, is preferably in the range from 0 to 30 mol %, preferably from 0.1 to 20 mol %, in particular from 0.5 to 10 mol %.

Preference is given to using mixtures of at least two different aromatic carboxylic acids in step i. Particular preference is given to using mixtures which comprise aromatic carboxylic acids together with heteroaromatic carboxylic acids. The mixing ratio of aromatic carboxylic acids to heteroaromatic carboxylic acids is preferably in the range from 1:99 to 99:1, preferably from 1:50 to 50:1.

These mixtures are preferably mixtures of N-heteroaromatic dicarboxylic acids and aromatic dicarboxylic acids. Nonlimiting examples of such dicarboxylic acids are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid and 2,5-pyrazinedicarboxylic acid.

In the monomer beads of the invention, the ratio of the amino groups derived from the tetraamino compounds to the carboxylic acid groups derived from the aromatic carboxylic acids is preferably in the range from 2.1:1 to 1.9:1.

Furthermore, the proportion of oligomers or polymers in the monomer beads is very low. The molar proportion of amide groups and/or imide groups based on the total number of all amino groups is preferably less than 1:1, advantageously less than 0.5:1, particularly preferably less than 0.33:1, even more preferably less than 0.2:1, in particular less than 0.1:1.

Furthermore, the degree of polymerization of the mixture is very low. The number average degree of polymerization of the monomer beads, measured by means of gel permeation chromatography, is preferably less than 10, more preferably less than 5, advantageously less than 4, even more preferably less than 3, in particular less than 2.

The monomer beads of the invention are particularly suitable for producing a proton-conducting polymer membrane based on polyazoles. In this context, a procedure comprising the steps A) mixing of the monomer beads with polyphosphoric acid to form a solution or dispersion,
B) application of a layer to a support using the mixture from step A),
C) heating of the sheet-like structure/layer which can be obtained according to step B) to temperatures of up to 350° C., preferably up to 280° C., to form the polyazole polymer,
D) treatment of the membrane formed in step C) in the presence of moisture at temperatures and for a time sufficient for this to be self-supporting has been found to be particularly useful.

Step A) is preferably carried out at a temperature in the range from 25° C. to <100° C. for from 0.1 hour to 10 hours.

The polyphosphoric acid used in step A) is a commercial polyphosphoric acid as can be obtained, for example, from Riedel-de Haen. The polyphosphoric acids $H_{n+2}P_nO_{3n+1}$ (n>1) usually have a content calculated as $P_2O_5$ (acidimetric) of at least 80%, particularly preferably at least 83%. Instead of a solution of the monomers, a dispersion/suspension can also be produced.

The mixture produced in step A) preferably has a weight ratio of polyphosphoric acid to the sum of all monomers of from 1:10 000 to 10 000:1, preferably from 1:1000 to 1000:1, in particular from 1:100 to 100:1.

The layer formation according to step B) is effected by means of measures known per se (casting, spraying, doctor blade coating) which are known from the prior art in the field of polymer film production. All supports which are inert under the conditions are suitable as supports. To adjust the viscosity, the solution can optionally be admixed with phosphoric acid, in particular concentrated phosphoric acid, 85%.

In this way, the viscosity can be set to the desired value and the formation of the membrane aided.

The layer produced according to step B) has a thickness in the range from 20 μm to 4000 μm, preferably in the range from 30 μm to 3500 μm, in particular from 50 μm to 3000 μm.

The polymerization is carried out in step C). For this purpose, the mixture is heated to a temperature of up to 350° C., preferably up to 280° C., in particular up to 250° C. The mixture is preferably heated in a closed reactor. In one variant, the water formed by the polycondensation can be completely or partly removed. This can be effected by separating of the water or by use of anhydrides.

The polyazole-based polymer formed in step C) comprises recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)

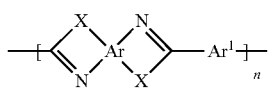
(I)

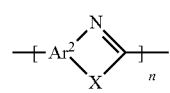
(II)

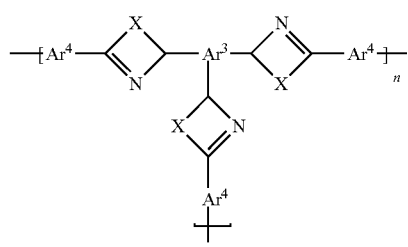
(III)

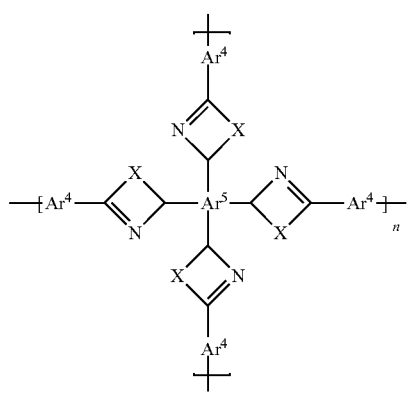
(IV)

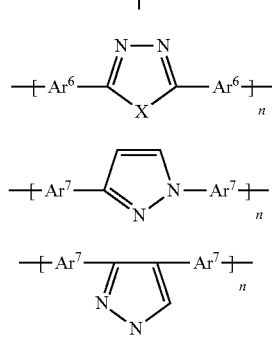
(V)

(VI)

(VII)

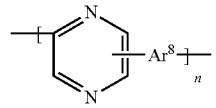
(VIII)

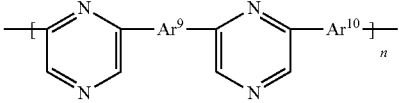
(IX)

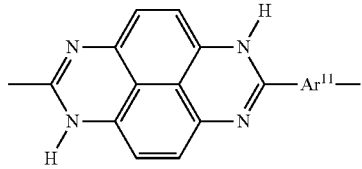
(X)

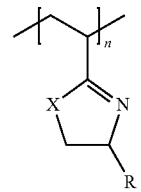
(XI)

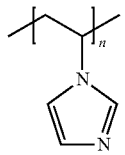
(XII)

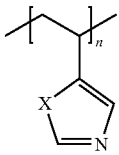
(XIII)

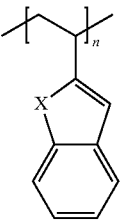
(XIV)

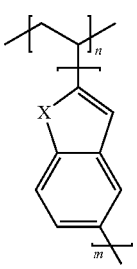
(XV)

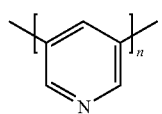
(XVI)

-continued (XVII)

(XVIII)

(XIX)

(XX)

(XXI)

(XXII)

where
the radicals Ar are identical or different and are each a tetravalent aromatic or heteroaromatic group which can comprise one or more rings,
the radicals $Ar^1$ are identical or different and are each a divalent aromatic or heteroaromatic group which can comprise one or more rings,
the radicals $Ar^2$ are identical or different and are each a divalent or trivalent aromatic or heteroaromatic group which can comprise one or more rings,
the radicals $Ar^3$ are identical or different and are each a trivalent aromatic or heteroaromatic group which can comprise one or more rings,
the radicals $Ar^4$ are identical or different and are each a trivalent aromatic or heteroaromatic group which can comprise one or more rings,
the radicals $Ar^5$ are identical or different and are each a tetravalent aromatic or heteroaromatic group which can comprise one or more rings,
the radicals $Ar^6$ are identical or different and are each a divalent aromatic or heteroaromatic group which can comprise one or more rings,
the radicals $Ar^7$ are identical or different and are each a divalent aromatic or heteroaromatic group which can comprise one or more rings,
the radicals $Ar^8$ are identical or different and are each a trivalent aromatic or heteroaromatic group which can comprise one or more rings,
the radicals $Ar^9$ are identical or different and are each a divalent or trivalent or tetravalent aromatic or heteroaromatic group which can comprise one or more rings,
the radicals $Ar^{10}$ are identical or different and are each a divalent or trivalent aromatic or heteroaromatic group which can comprise one or more rings,
the radicals $Ar^{11}$ are identical or different and are each a divalent aromatic or heteroaromatic group which can comprise one or more rings,
the radicals X are identical or different and are each oxygen, sulfur or an amino group bearing a hydrogen atom, a group having 1-20 carbon atoms, preferably a branched or unbranched allyl or alkoxy group, or an aryl group as further radical,
the radicals R are identical or different and are each hydrogen, an alkyl group or an aromatic group, with the proviso that R in formula (XX) is not hydrogen, and
n, m are each an integer greater than or equal to 10, preferably greater than or equal to 100.

Preferred aromatic or heteroaromatic groups are derived from benzene, naphthalene, biphenyl, diphenyl ether, diphenylmethane, diphenyldimethylmethane, bisphenone, diphenyl sulfone, quinoline, pyridine, bipyridine, pyridazine, pyrimidine, pyrazine, triazine, tetrazine, pyrrole, pyrazole, anthracene, benzopyrrole, benzotriazole, benzooxathiadiazole, benzooxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may optionally also be substituted.

Here, $Ar^1$, $Ar^4$, $Ar^6$, $Ar^7$, $Ar^8$, $Ar^9$, $Ar^{10}$, $Ar^{11}$ can have any substitution pattern; in the case of phenylene, for example, $Ar^1$, $Ar^4$, $Ar^6$, $Ar^7$, $Ar^8$, $Ar^9$, $Ar^{10}$, can be ortho-, meta- or para-phenylene. Particularly preferred groups are derived from benzene and biphenylene which may optionally also be substituted.

Preferred alkyl groups are short-chain alkyl groups having from 1 to 4 carbon atoms, e.g. methyl, ethyl, n- or i-propyl and t-butyl groups.

Preferred aromatic groups are phenyl or naphthyl groups. The alkyl groups and the aromatic groups may be substituted.

Preferred substituents are halogen atoms such as fluorine, hydroxyl groups or short-chain alkyl groups such as methyl or ethyl groups.

Preference is given to polyazoles having recurring units of the formula (I) in which the radicals X are identical within a recurring unit.

The polyazoles can in principle also have different recurring units which differ, for example, in their radical X. However, preference is given to only identical radicals X being present in a recurring unit.

Further preferred polyazole polymers are polyimidazoles, polybenzothiazoles, polybenzoxazoles, polyoxadiazoles, polyquinoxalines, polythiadiazoles, poly(pyridines), poly(pyrimidines), and poly(tetrazapyrenes).

In a further embodiment of the present invention, the polymer comprising recurring azole units is a copolymer or blend comprising at least two units of the formula (I) to (XXII) which differ from one another. The polymers can be present as block copolymers (diblock, triblock), random copolymers, periodic copolymers and/or alternating polymers.

In a particularly preferred embodiment of the present invention, the polymer comprising recurring azole units is a polyazole which comprises only units of the formula (I) and/or (II).

The number of recurring azole units in the polymer is preferably an integer greater than or equal to 10. Particularly preferred polymers comprise at least 100 recurring azole units.

For the purposes of the present invention, polymers comprising recurring benzimidazole units are preferred. Some examples of the extremely advantageous polymers comprising recurring benzimidazole units are described by the following formulae:

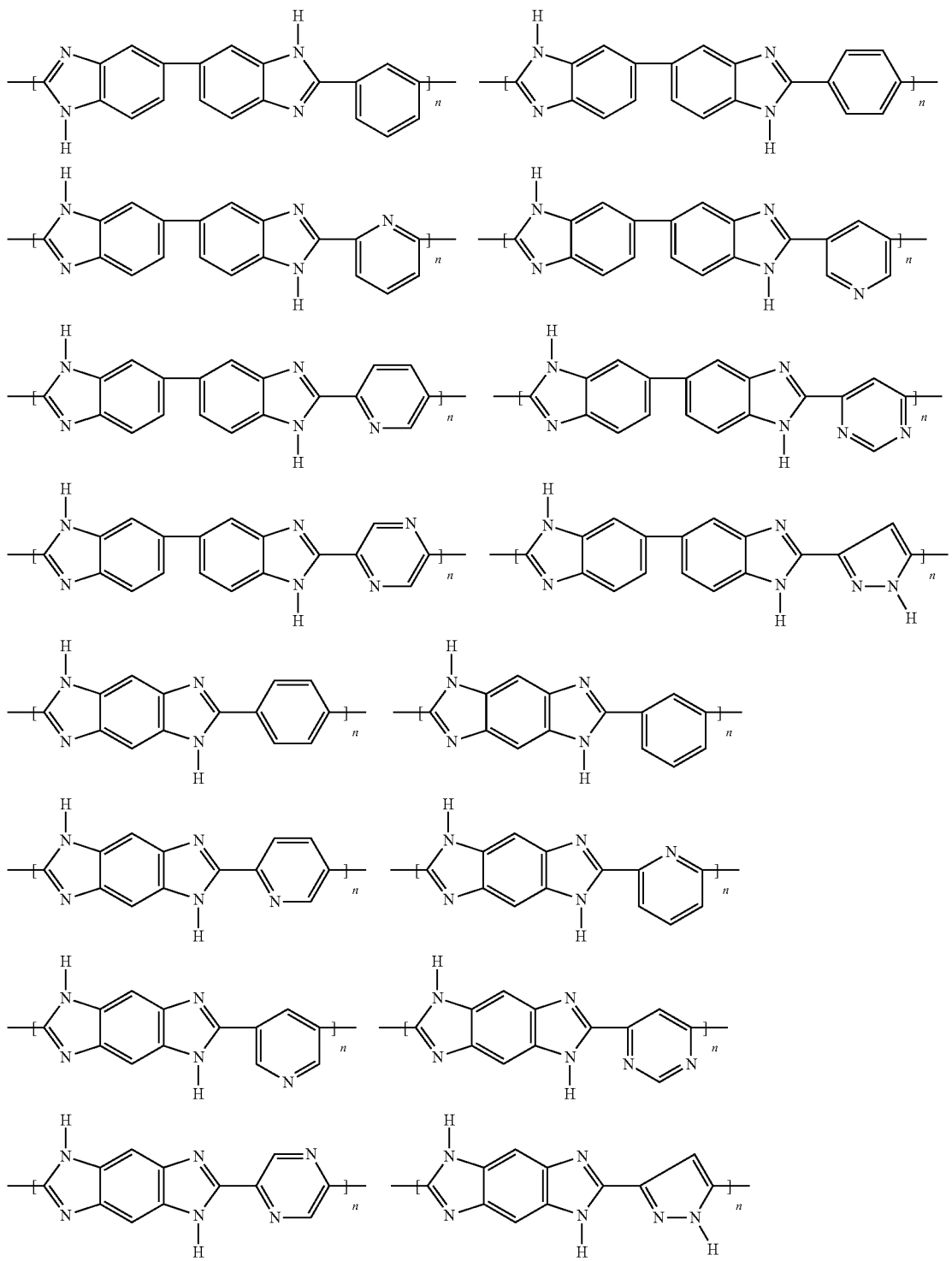

-continued

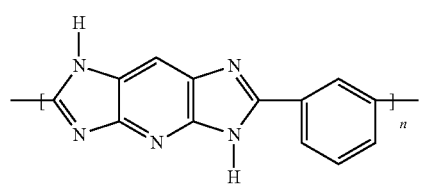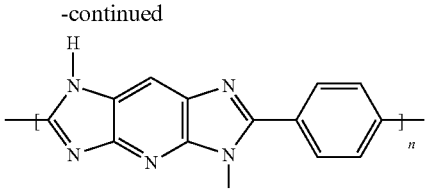

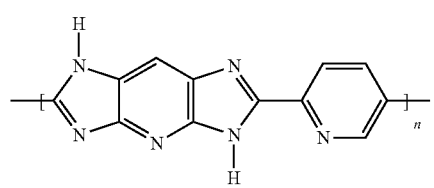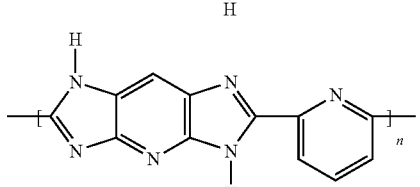

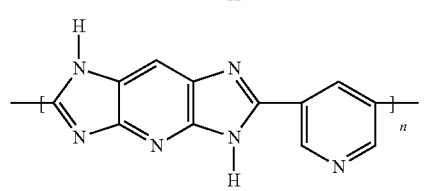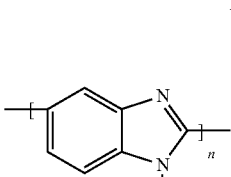

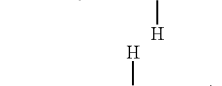

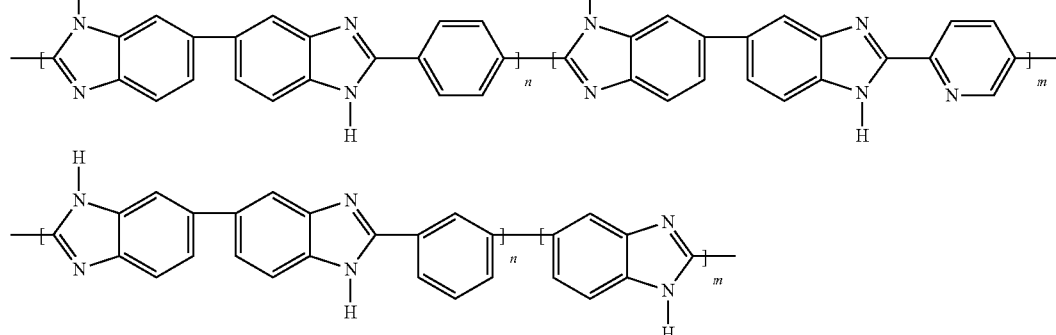

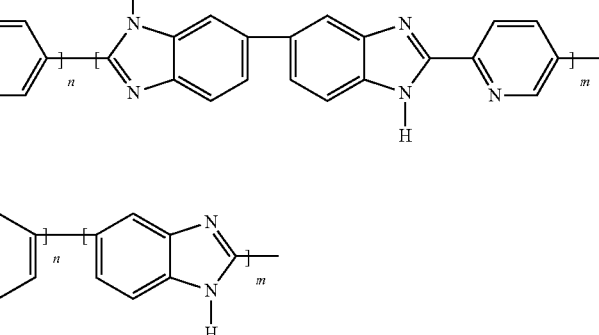

where n and m are each an integer greater than or equal to 10, preferably greater than or equal to 100.

The polyazoles which can be obtained by means of the process described, but in particular the polybenzimidazoles, have a high molecular weight. Measured as intrinsic viscosity, this is preferably at least 1.4 dl/g and is thus significantly above that of commercial polybenzimidazole (IV<1.1 dl/g).

If the monomer beads in step A) also comprise tricarboxylic acids and/or tetracarboxylic acids, these bring about branching/crosslinking of the polymer formed. This contributes to improving the mechanical properties of the membrane formed.

In a variant of the process, the formation of oligomers and/or polymers can be brought about by heating the mixture from step A) to temperatures of up to 350° C., preferably up to 280° C. Depending on the temperature and time selected, the subsequent heating in step C) can be partially or entirely omitted. This variant is also provided by the present invention.

Furthermore, it has been found that when aromatic dicarboxylic acids (or heteroaromatic dicarboxylic acids) such as isophthalic acid, terephthalic acid, 2,5-dihydroxyterephthalic acid, 4,6-dihydroxyisophthalic acid, 2,6-dihydroxyisophthalic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid are used, the temperature in step C), or in step A) if the formation of oligomers and/or polymers in step A) is desired, is advantageously in the range up to 300° C., preferably in the range from 100° C. to 250° C.

The treatment of the membrane in step D) is preferably carried out at temperatures above 0° C. and less than 150° C., preferably at temperatures in the range from 10° C. to 120° C., in particular in the range from room temperature (20° C.) to 90° C., in the presence of moisture or water and/or water vapor and/or water-comprising phosphoric acid having a concentration of up to 85%. The treatment is preferably carried out under atmospheric pressure, but can also be carried out under superatmospheric pressure. It is important that the treatment occurs in the presence of sufficient moisture, as a result of which the polyphosphoric acid present contributes, by partial hydrolysis to form low molecular weight polyphosphoric acid and/or phosphoric acid, to strengthening of the membrane.

The partial hydrolysis of polyphosphoric acid in step D) leads to strengthening of the membrane and to a decrease in the layer thickness and preferably to formation of a membrane which has a thickness in the range from 15 μm to 3000 μm, preferably from 20 μm to 2000 μm, in particular from 20 μm to 1500 μm, and is self-supporting.

The intramolecular and intermolecular structures (interpenetrating networks IPN) present in the polyphosphoric acid layer formed in step B) lead, in step C), to ordered membrane formation which is responsible for the particular properties of the membrane formed. The sol/gel transition which also takes place leads to formation of the particular membrane structure.

The upper temperature limit for the treatment according to step D) is generally 150° C. If moisture is present for an extremely short time, for example in the case of superheated steam, this steam can also be hotter than 150° C. Here, particular preference is given to steam having a temperature of up to 180° C., particularly preferably up to 150° C. The duration of the treatment is important for the upper limit to the temperature.

The partial hydrolysis (step D) can also be carried out in controlled-atmosphere chambers, with the hydrolysis being able to be controlled in a targeted manner under defined humidity conditions. Here, the humidity can be set in a targeted manner by means of the temperature or the saturation of the contacting surroundings, for example gases such as air, nitrogen, carbon dioxide or other suitable gases, or steam. The treatment time depends on the parameters selected above.

Furthermore, the treatment time depends on the thickness of the membrane.

In general, the treatment time is in the range from a few seconds to minutes, for example in the presence of superheated steam, or up to entire days, for example in air at room temperature and a low relative atmospheric humidity. The treatment time is preferably in the range from 10 seconds to 300 hours, in particular from 1 minute to 200 hours.

If the partial hydrolysis is carried out at room temperature (20° C.) using ambient air having a relative atmospheric humidity of 40%-80%, the treatment time is preferably in the range from 1 hour to 200 hours.

The membrane obtained according to step D) can be self-supporting, i.e. it can be detached without damage from the support and then optionally be processed further directly.

The concentration of phosphoric acid and thus the conductivity of the polymer membrane can be adjusted via the degree of hydrolysis, i.e. the duration, temperature and ambient humidity. According to the invention, the concentration of the phosphoric acid is reported as mole of acid per mole of repeating unit of the polymer. For the purposes of the present invention, a concentration (mole of phosphoric acid per repeating unit of the formula (III), e.g. polybenzimidazole) is preferably in the range from 10 to 50, in particular from 12 to 40. Such high degrees of doping (concentrations) are very difficult or impossible to obtain by doping of polyazoles with commercially available ortho-phosphoric acid.

After the treatment according to step D), the membrane can also be crosslinked on the surface by action of heat in the presence of atmospheric oxygen. This curing of the membrane surface effects an additional improvement in the properties of the membrane.

Crosslinking can also be effected by action of IR or NIR (IR=infrared, i.e. light having a wavelength of more than 700 nm; NIR=near IR, i.e. light having a wavelength in the range from about 700 to 2000 nm or an energy in the range from about 0.6 to 1.75 eV). A further method is irradiation with β-rays. The radiation dose is here preferably in the range from 5 kGy to 200 kGy.

The polymer membrane which can be obtained according to the invention has improved materials properties compared to the doped polymer membranes known hitherto. In particular, it displays better performance compared to known doped polymer membranes. This is based on, in particular, an improved proton conductivity. The latter is at least 0.1 S/cm, preferably at least 0.11 S/cm, in particular at least 0.12 S/cm, at temperatures or 120° C.

To improve the use properties further, fillers, in particular proton-conducting fillers, and additional acids can additionally be added to the membrane. The addition can be carried out either in step A or B or after the polymerization.

Nonlimiting examples of proton-conducting fillers are sulfates such as $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, phosphates such as $Zr_3(PO_4)_4$, $Zr(HPO_4)_2$, $HZr_2(PO_4)_3$, $UO_2PO_4.3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, polyacids such as $H_3PW_{12}O_{40}.nH_2O$ (n=21-29), $H_3SiW_{12}O_{40}.nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$ selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, oxides such as $Al_2O_3$, $Sb_2O_5$, $ThO_2$, $SnO_2$, $ZrO_2$, $MoO_3$ silicates such as zeolites, ($NH_4$+) zeolites, sheet silicates, framework silicates, H-natrolite, H-mordenite, $NH_4$-analcine, $NH_4$-sodalite, $NH_4$-gallate, H-montmorillonite acids such as $HClO_4$, $SbF_5$ fillers such as carbides, in particular SiC, $Si_3N_4$, fibers, in particular glass fibers, glass powders and/or polymer fibers, preferably based on polyazoles.

Furthermore, this membrane can also comprise perfluorinated sulfonic acid additives (0.1-20% by weight, preferably 0.2-15% by weight, very particularly preferably 0.2-10% by weight). These additives lead to an improvement in performance, in the vicinity of the cathode to an increase in the oxygen solubility and oxygen diffusion and to a reduction in the adsorption of phosphoric acid and phosphate on platinum. (Electrolyte additives for phosphoric acid fuel cells. Gang, Xiao; Hjuler, H. A.; Olsen, C.; Berg, R. W.; Bjerrum, N. J. Chem. Dep. A, Tech. Univ. Denmark, Lyngby, Den. J. Electrochem. Soc. (1993), 140(4), 896-902 and Perfluorosulfonimide as an additive in phosphoric acid fuel cell. Razaq, M.; Razaq, A.; Yeager, E.; DesMarteau, Darryl D.; Singh, S. Case Cent. Electrochem. Sci., Case West. Reserve Univ., Cleveland, Ohio, USA. J. Electrochem. Soc. (1989), 136(2), 385-90.)

Nonlimiting examples of persulfonated additives are:

trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexanesulfonate, lithium perfluorohexanesulfonate, ammonium perfluorohexanesulfonate, perfluorohexanesulfonic acid, potassium nonafluorobutanesulfonate, sodium nonafluorobutanesulfonate, lithium nonafluorobutanesulfonate, ammonium nonafluorobutanesulfonate, cesium nonafluorobutanesulfonate, triethylammonium perfluorohexanesulfonate, perfluorosulfonimides and Nafion.

Furthermore, the membrane can also comprise additives which scavenge (primary antioxidants) or destroy (secondary antioxidants) free peroxide radicals produced in the reduction of oxygen during operation and thereby, as described in JP2001118591 A2, improve the life and stability of the membrane and membrane-electrode assembly. The function and molecular structures of such additives are described in F. Gugumus in Plastics Additives, Hanser Verlag, 1990; N. S.

Allen, M. Edge Fundamentals of Polymer Degradation and Stability, Elsevier, 1992; or H. Zweifel, Stabilization of Polymeric Materials, Springer, 1998.

Nonlimiting examples of such additives are: bis(trifluoromethyl) nitroxide, 2,2-diphenyl-1-picrinylhydrazyl, phenols, alkylphenols, sterically hindered alkylphenols, for example Irganox, aromatic amines, sterically hindered amines, for example Chimassorb; sterically hindered hydroxylamines, sterically hindered alkylamines, sterically hindered hydroxylamines, sterically hindered hydroxylamine ethers, phosphites, for example Irgafos, nitrosobenzene, methyl-2-nitrosopropane, benzophenone, benzaldehyde tert-butyl nitrone, cysteamine, melamines, lead oxides, manganese oxides, nickel oxides, cobalt oxides.

Possible fields of use of the doped polymer membranes according to the invention include, inter alia, use in fuel cells, in electrolysis, in capacitors and in battery systems. Owing to their property profile, the doped polymer membranes are preferably used for membrane-electrode assemblies for fuel cells.

Further information about membrane-electrode assemblies may be found in the specialist literature, in particular the patents U.S. Pat. No. 4,191,618, U.S. Pat. No. 4,212,714 and U.S. Pat. No. 4,333,805. The disclosure in respect of the structure and production of membrane-electrode assemblies and also the electrodes, gas diffusion layers and catalysts to be selected comprised in the abovementioned references [U.S. Pat. No. 4,191,618, U.S. Pat. No. 4,212,714 and U.S. Pat. No. 4,333,805] is hereby incorporated by reference as part of the description.

In one variant of the present invention, membrane formation can occur directly on the electrode rather than on a support. The treatment according to step D) can be correspondingly shortened in this way since the membrane no longer has to be self-supporting. Such a membrane is also provided by the present invention.

The invention is illustrated below by means of an example, without this constituting a restriction of the scope of the invention.

EXAMPLE

A stoichiometric mixture of 3,3',4,4'-tetraaminobiphenyl (TAB) and terephthalic acid (TPA) was extruded continuously by means of a corotating screw extruder.

The extrusion conditions were as follows:
screw length: 400 mm
die opening: 5 mm
introduction of the materials at room temperature (25° C.)
set temperature of the extruder: 230° C.
moment at the die: 1.9 Nm
speed of rotation: 100 rpm
throughput: 0.8 kg/h
no use of kneading elements
The extrusion was carried out as follows:

The extruder was heated to 230° C. Pure TAB was firstly introduced. The feed ratio of TAB was then slowly reduced from 100% to 50% by adding TPA. The slow transition from 100% to 50% reduced the residence time of the blend (50:50) in the extruder and in this way reduced the risk of polymerization in the extruder.

The molten droplets were collected in an oil which was stirred by means of a magnetic stirrer. The oil could be removed from the resulting beads by washing with cyclohexane.

The beads had a diameter in the range from 2 to 3 mm and could easily be transported and processed further.

The invention claimed is:

1. A process for producing monomer beads, wherein
i. mixing one or more aromatic tetraamino compounds with one or more aromatic carboxylic acids comprising at least two acid groups per carboxylic acid monomer in an extruder and melted at 190° C.-270° C.;
ii. the melt is dropletized at 190° C.-270° C. by means of a die located at the extruder outlet;
iii. collecting, cooling and allowing the liquid droplets to solidify and wherein the average residence time of the mixture of tetraamino compounds and carboxylic acids in the extruder is less than 10 minutes.

2. The process according to claim 1, wherein the mixture is melted at a temperature in the range from 200° C. to 250° C.

3. The process according to claim 1, wherein the melt is dripped into an inert liquid.

4. The process according to claim 3, wherein the solidified beads are washed with an inert solvent and dried.

5. The process according to claim 1, wherein the solidified beads are washed with cyclohexane, pentane, hexane, heptane, benzene and/or toluene, and dried at a temperature in the range from 25° C. to 150° C. and the melt is dripped into a mineral oil.

6. The process according claim 1, wherein the aromatic tetraamino compound is 3,3',4,4'-tetraaminobiphenyl, 2,3,5,6-tetraaminopyridine, 1,2,4,5-tetraaminobenzene, bis(3,4-diaminophenyl) sulfone, bis(3,4-diaminophenyl) ether, 3,3',4,4'-tetraaminobenzophenone, 3,3',4,4'-tetraaminodiphenylmethane or 3,3',4,4'-tetraaminodiphenyldimethylmethane or a mixture thereof.

7. The process according to claim 1, wherein the aromatic dicarboxylic acid is isophthalic acid, terephthalic acid, phthalic acid, 5-hydroxyisophthalic acid, 4-hydroxyisophthalic acid, 2-hydroxyterephthalic acid, 2,5-dihydroxyterephthalic acid, 2,5-dihydroxyisophthalic acid, 2,3-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl)sulfone, biphenyl-4,4'-dicarboxylic acid, 4-trifluoromethylphthalic acid, 2,2-bis(4-carboxyphenyl)hexafluoropropane, 4,4'-stilbenedicarboxylic acid or 4-carboxycinnamic acid or a mixture thereof.

8. The process according to claim 7, wherein the content of tricarboxylic acids and/or tetracarboxylic acids, based on the dicarboxylic acids used, is in the range from 0.1 mol % to 20 mol %.

9. The process according to claim 1, wherein said carboxylic acid is a heteroaromatic dicarboxylic acid, tricarboxylic acid and/or tetracarboxylic acid comprising at least one nitrogen, oxygen, sulfur or phosphorus atom in the aromatic.

10. The process according to claim 1, wherein said carboxylic acid is pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid or benzoimidazole-5,6-dicarboxylic acid or a mixture thereof.

* * * * *